US006253094B1

(12) United States Patent
Schmutz (10) Patent No.: US 6,253,094 B1
(45) Date of Patent: Jun. 26, 2001

(54) SECTORIZED CELL HAVING NON-REDUNDANT BROADBAND PROCESSING UNIT

(75) Inventor: Thomas R. Schmutz, Melbourne, FL (US)

(73) Assignee: Airnet Communications Corporation, Melbourne, FL (US)

( * ) Notice: Subject to any disclaimer, the term of this patent is extended or adjusted under 35 U.S.C. 154(b) by 0 days.

(21) Appl. No.: 09/112,149

(22) Filed: Jul. 9, 1998

(51) Int. Cl.$^7$ ....................................................... H04M 1/00
(52) U.S. Cl. .......................... 455/562; 455/103; 455/132; 455/137; 455/277.1; 370/334; 370/347; 370/362
(58) Field of Search ..................................... 455/562, 102, 455/103, 132, 137, 277.1; 370/347, 362, 334

(56) References Cited

U.S. PATENT DOCUMENTS 5,832,389  * 11/1998  Dent ...................................... 455/562
5,893,033  *  4/1999  Keskitalo et al. .................... 455/437
6,006,113  * 12/1999  Meredith .............................. 455/562

* cited by examiner

Primary Examiner—Lee Nguyen

(74) Attorney, Agent, or Firm—Akerman Senterfitt (57) ABSTRACT

A technique for converting a non-sectorized cell to a sectorized cell having multiple sectors utilizing a single broadband processing unit. The spectrum of a given frequency band having a center frequency $'\Omega_o$ is divided into multiple bands (three, for example) having center frequencies $'\Omega_o$, $'\Omega_o-\alpha$ and $'\Omega_o+\alpha$. In the receive path, respective sub-bands are used to convey analog RF signals from a subscriber in respective sectors to an associated transceiver. Each of the transceivers includes a front end for receiving incoming RF signals and an analog-to-digital converter for converting the analog signal to a digital data stream. The digital data streams from transceivers are combined, i.e., processed by digitally adding, and supplied to a single channelizer which, in turn, supplies the data to a TDM bus for transmission to a PSTN network. In the reverse path from the PSTN network, TDM digital data signals emanating from a TDM bus are supplied to a combiner which feeds each of the respective transceivers which select the appropriate data from the combiner by digital filtering or processing. The transceivers convert the digital signal to analog form. After conversion, power amplifiers associated with the respective sectors effect emission of radiated power in the respective sectors. Advantageously, amplifiers in the sectorized improvement operate at lower power levels than the single high power amplifier of a non-sectorized cell, thereby providing substantial cost savings. More importantly, instead of deploying multiple broadband processing units the improved sectorized cell requires only a single broadband processing unit, thereby providing further economies.

7 Claims, 7 Drawing Sheets

SECTORIZED CELL HAVING NON-REDUNDANT BROADBAND PROCESSING UNIT

BACKGROUND

1. Field of the Invention

The present invention relates to wireless communication systems, but more particularly, to a method and system for attaining sectorization in a cellular communication system utilizing a single broadband processing unit.

2. Discussion of the Prior Art

In order to provide multi-channel voice and data communications over a broad geographical area, wireless communication providers currently install base station transceivers in protected and maintainable structures, known as cell sites. A cell site encompasses an antenna, a tower or building upon which the antenna is mounted, high-power amplifiers, duplexers, transmitters, receivers and broadband processing equipment. The broadband processing equipment channelizes and combines digital signals on multiple channels that are associated with respective subscribers. The digital signals, however, are communicated over the air with subscribers in the analog domain. Thus, the base station equipment further includes analog-to-digital and digital-to-analog converters, depending on the direction of information flow, as described in commonly owned U.S. Pat. Nos. 5,535,240 and 5,592,480 which issued Jul. 9, 1996 and Jan. 7, 1997, respectively, to Ronald R. Carney, et al., incorporated herein by reference.

The cell itself is an area on the ground that is generally depicted as a hexagon. This is the simplest way to illustrate the cellular idea, but in reality, the actual shape of the cell and the coverage provided by the radiated signal from the cell site is rarely as regular, uniform and clearly defined. The actual shape of the cell depends upon the contours and the condition of the terrain surrounding the cell site. Factors such as the size and number of trees and/or the degree of urbanization determine how large an area one cell can cover. The cell may itself be sectorized wherein it is provided with an antenna designed to concentrate energy in an arc of 120 degrees rather than the usual 360 degrees. Different frequencies may be used for each sector, and these frequencies may be repeated among cells. Using the sectorization, the cell site is able to accommodate communication for a greater number of subscribers. The instant application is directed to sectorization which is sometimes referred to as cell-splitting.

Each sector is configured to provide two-way (duplex) multi-channel communication capability for only a limited portion of the frequency spectrum that is allotted to the wireless communication service provider. A typical cellular communication channel consists of a pair of frequencies, one for each direction of transmission, used for full-duplex operation. A typical transceiver consists of multiple sets of discrete receiver and transmitter signal processing components in order to service a particular portion of the frequency spectrum, usually 400 30 Khz channels within a 12 MHZ bandwidth. The receiver section of a typical transceiver includes a dedicated set of signal processing components, including a front end, an intermediate frequency (IF) section and a baseband section.

A primary limitation in current cellular communication systems is that a service provider is only allocated a fixed number of frequencies with which to handle subscriber calls. Typically, there must be a 35 mile separation between cells using the same frequency set, so that subscribers communicating on the same frequencies do not interfere with one another. Frequency reuse allows subscribers to use the same frequencies in adjoining cells without interference, thereby allowing a service provider to accommodate more subscribers.

Whenever a base station employs sectorization, however, each sector requires its own broadband processing unit to perform digital combining and channelizing. Unfortunately, such replication of digital processing equipment increases the complexity and expense of the base station.

SUMMARY OF THE INVENTION

It is a general objective of the present invention to increase the channel capacity of a cell using existing broadband processing equipment.

It is a more specific objective of the invention to provide a scheme for sectorizing a cell without replication of broadband processor units.

It is another object of the invention to provide a sectorized communication cell using lower power transmitters for the respective sectors.

In accordance with the invention, the improvement comprises a technique in which a non-sectorized cell is converted to a sectorized cell having multiple sectors. In a preferred embodiment, the spectrum of given frequency band having a center frequency $'\Omega_o$ is divided into multiple bands (three, for example) having center frequencies $'\Omega_o$, $'\Omega_o-\alpha$ and $'\Omega_o+\alpha$ (in the case where three sectors are employed). In the receive path, respective sub-bands are used to convey analog RF signals in respective sectors to a transceiver. Each of the transceivers include a front end for receiving incoming RF signals and an analog-to-digital converter for converting the analog signal to a digital data stream. The digital data streams from transceivers are combined, i.e., processed by digitally adding, and supplied to a single channelizer which, in turn, supplies the data to a TDM bus. In the reverse path, TDM digital data signals emanating from TDM bus are supplied to a combiner which feeds each of the respective transceivers, which select the appropriate data from the combiner by digital filtering or processing. The transceivers convert the digital signal to analog form. After conversion, power amplifiers associated with the respective sectors effect emission of radiated power in the respective sectors.

Advantageously, amplifiers in the sectorized improvement operate at lower power levels than the single high power amplifier of a non-sectorized cell thereby providing substantial cost savings. More importantly, instead of deploying multiple broadband processing units, the improved sectorized cell requires only a single broadband processing unit, thereby providing further economies. The invention only requires software modification of the broadband processing unit used in a single cell site to handle information distributed in different spectral bands associated with the sectors.

These and other objects of the invention will become apparent upon review of the accompanying disclosure when read in conjunction with the accompanying drawing figures, wherein like reference numerals designate the same of corresponding parts throughout the several views.

DESCRIPTION OF ILLUSTRATIVE EMBODIMENTS

The geographic disbursements optimizes service coverage with the entire bandwidth (e.g. 12 MHz) available to the service provider, and ensures non-interfering coverage among dispersed cell sites. Over a broad geographical area however, the frequency allocation within respective cells and the separation between adjacent cell sites may be prescribed to effectively prevent mutual interference among any of the channels of the system. Thus, frequency reuse is the core concept of cellular communications. A rule of thumb in the cellular industry states that a channel can be reused again in every seven cells. The application of this rule varies due to the factors that determine the size of a cell and the propagation of cellular transmissions such as the particular terrain, the degree and density of urban growth, the expected number of subscribers, etc. Since a system operator cannot add channels to their system—each system is limited to 400 channels—frequency reuse schemes are often employed.

Figure 1:
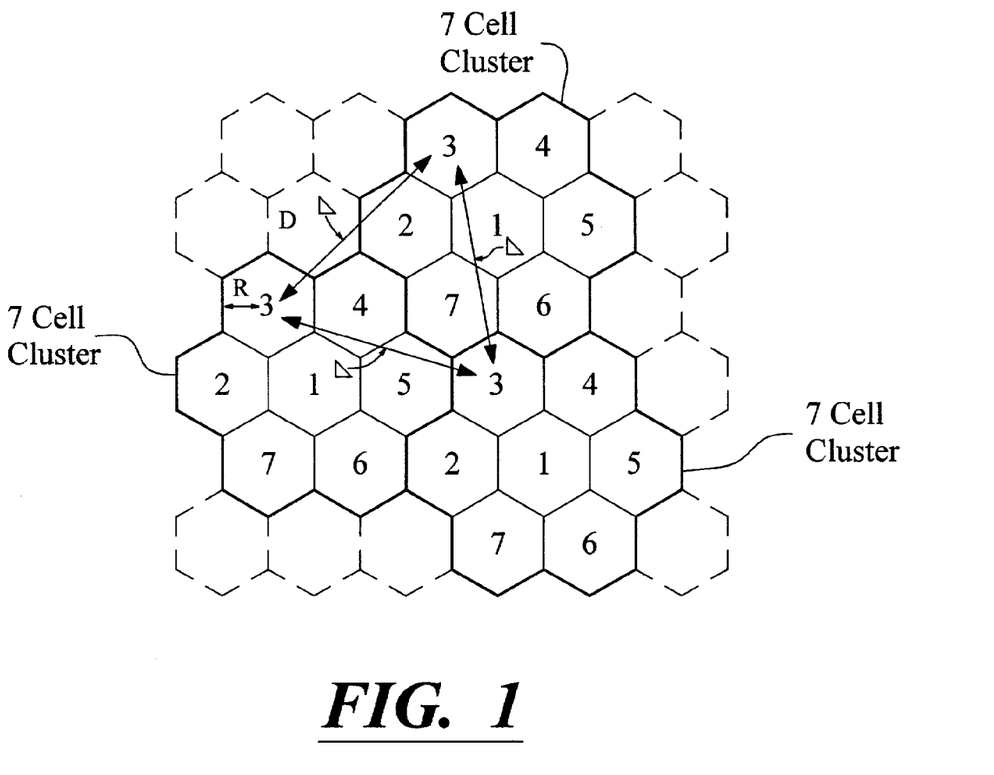
FIG. 1 depicts a frequency reuse scheme in a cellular communication system useful for describing the present invention.

FIG. 1 depicts a typical cellular communication pattern. The frequency assignments are fixed to seven discrete channel sets. The frequencies used in this arrangement of cells helps prevent interference between cells with identical frequency assignments (i.e. co-channel cells) by separating these cells by at least two cells of different frequency assignments. The instant sectorization scheme allows for one cell to handle more than one frequency set.

Figure 2A:
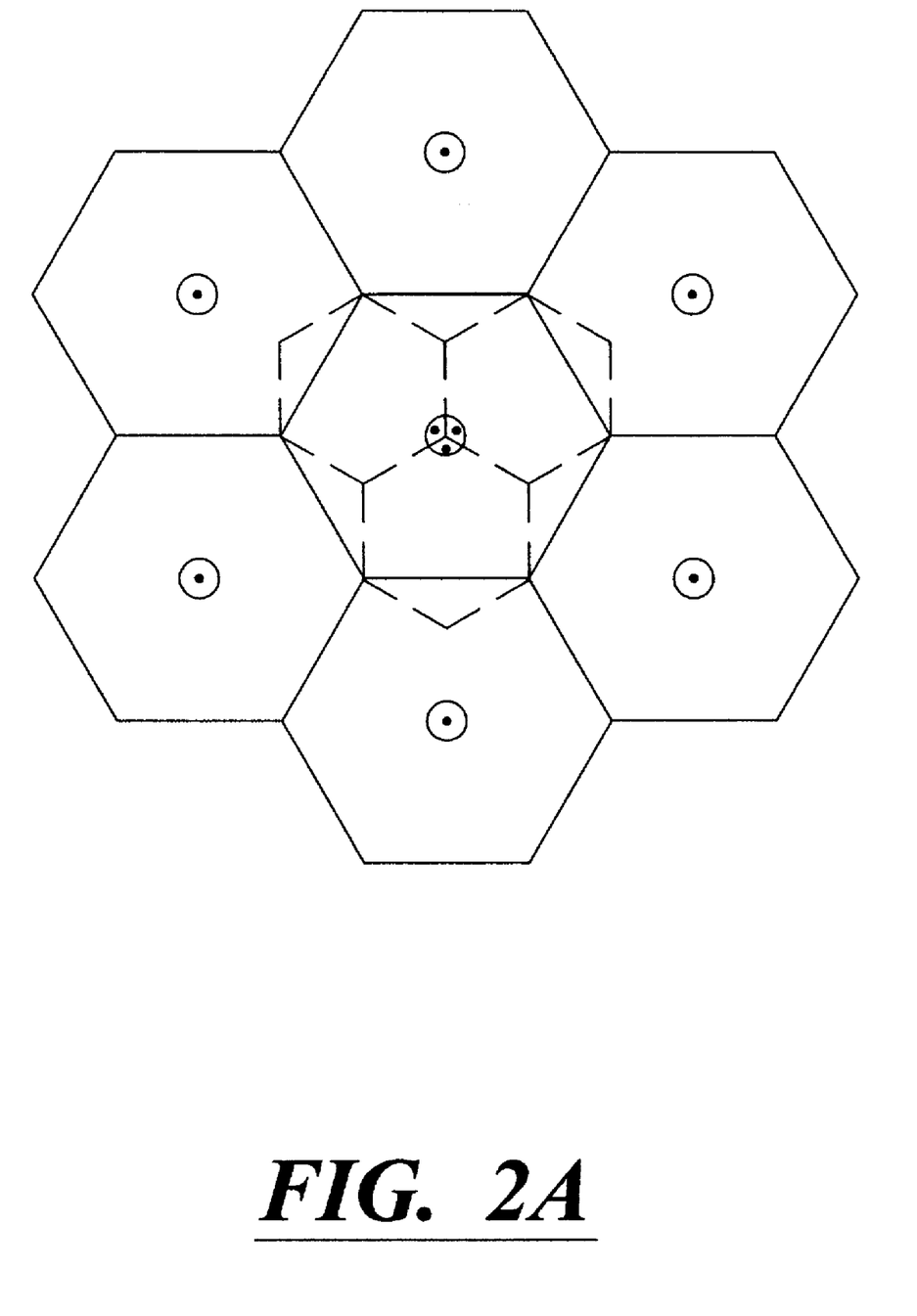
FIG. 2A illustrates a sectorized cell among plural cells in a frequency reuse scheme of a cellular communication system.

FIG. 2A depicts a sectorized cell resulting from implementation of the invention. By changing the antenna design in the cell so that radiated energy is concentrated in an arc of 120 degrees rather than the complete 360 degree circle, the number of cells appears to increase. Using the sectorization technique, only the antenna needs to be changed, and the additional equipment aassociated with a cell site can remain the same. If each of the seven cells shown in FIG. 2A were sectorized, the resulting system would appear to have a total of twenty-one cells, and therefore could accommodate twenty times more subscriber communications simultaneously.

Figure 2B:
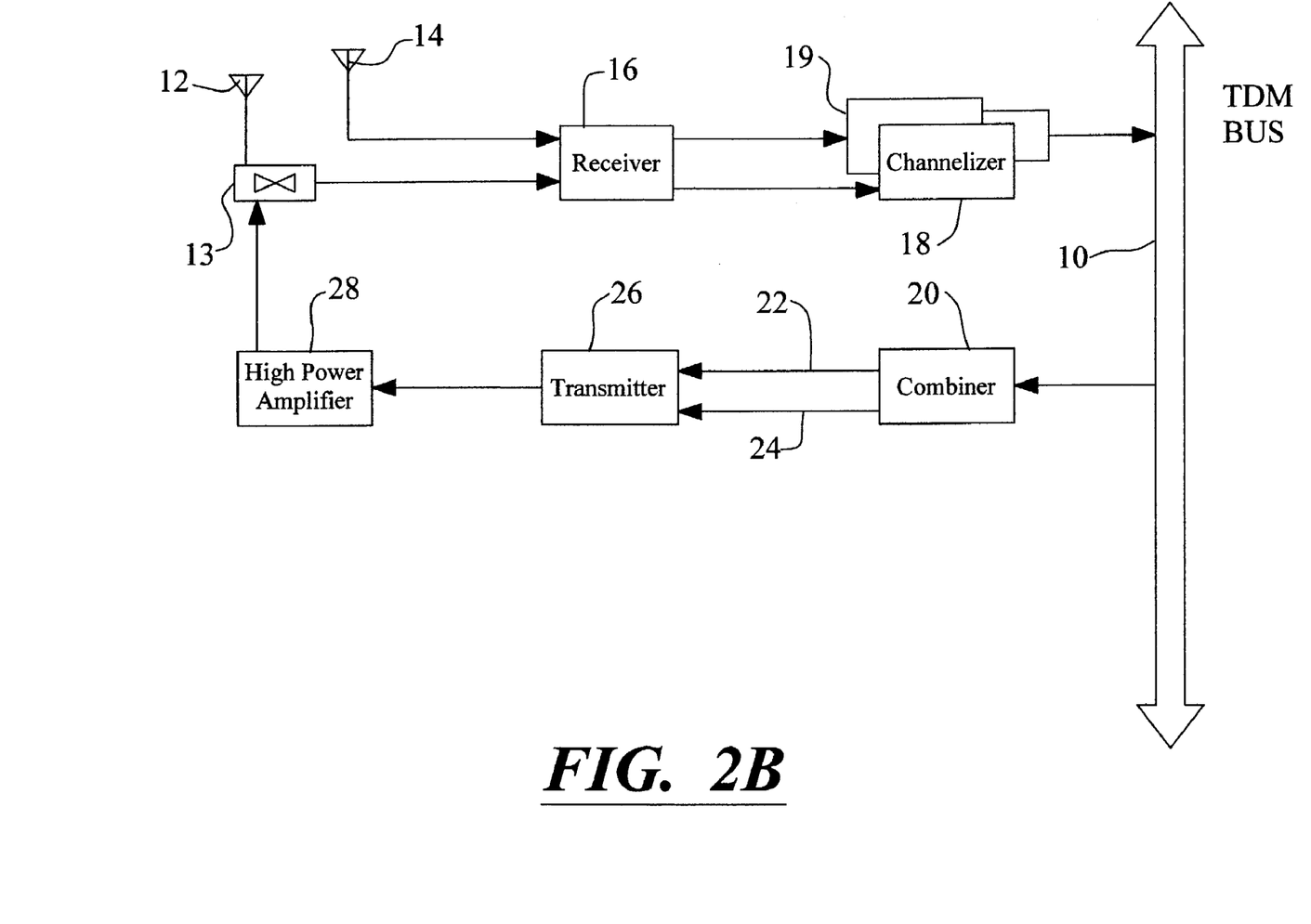
FIG. 2B depicts respective transmitter and receiver paths of a base station transceiver in which the present invention is employed.

FIG. 2B shows a non-sectorized cellular transceiver site over which the present invention is an improvement. In the non-sectorized site, digital data signals from a PSTN (or other data network) via time division multiplex (TDM) bus 10 are conveyed to and from subscriber units via antennas 12 and 14. In a receive path, a receiver 16 receives broadband RF signals from subscribers via antennas 12 and 14. Duplexer 13 isolates the respective transmit and receive paths. Receiver 16 converts the broadband analog signals to a digital data stream which is supplied to a channelizer 18 associated with antenna 12. The channelizer 18 separates, in a manner described in U.S. Pat. No. 5,592,480, the digital data stream into multiple data channels associated with respective subscribers and supplies the same to TDM bus 10.

An antenna 14 operating at a different frequency at another cell or sector receives signals for processing by a tandem channelizer 19 operating at a co-located or distant cell site. Multiple receive antennas and channelizers may be employed, although only two are illustrated. The combination of the channelizer and combiner is called a Carney engine.

On the transmit side, signals from multiple data channels originating from TDM bus 10 are supplied to a combiner 20. Combiner 20 supplies serial bit streams along output 22 to a transmitter unit 26 which converts the digital data on respective paths to analog signal. Analog signals from the transmitter 26 drive a high power amplifier 28 to produce an RF signal for transmission to subscribers via duplexer 13 and antenna 12.

Figure 3:
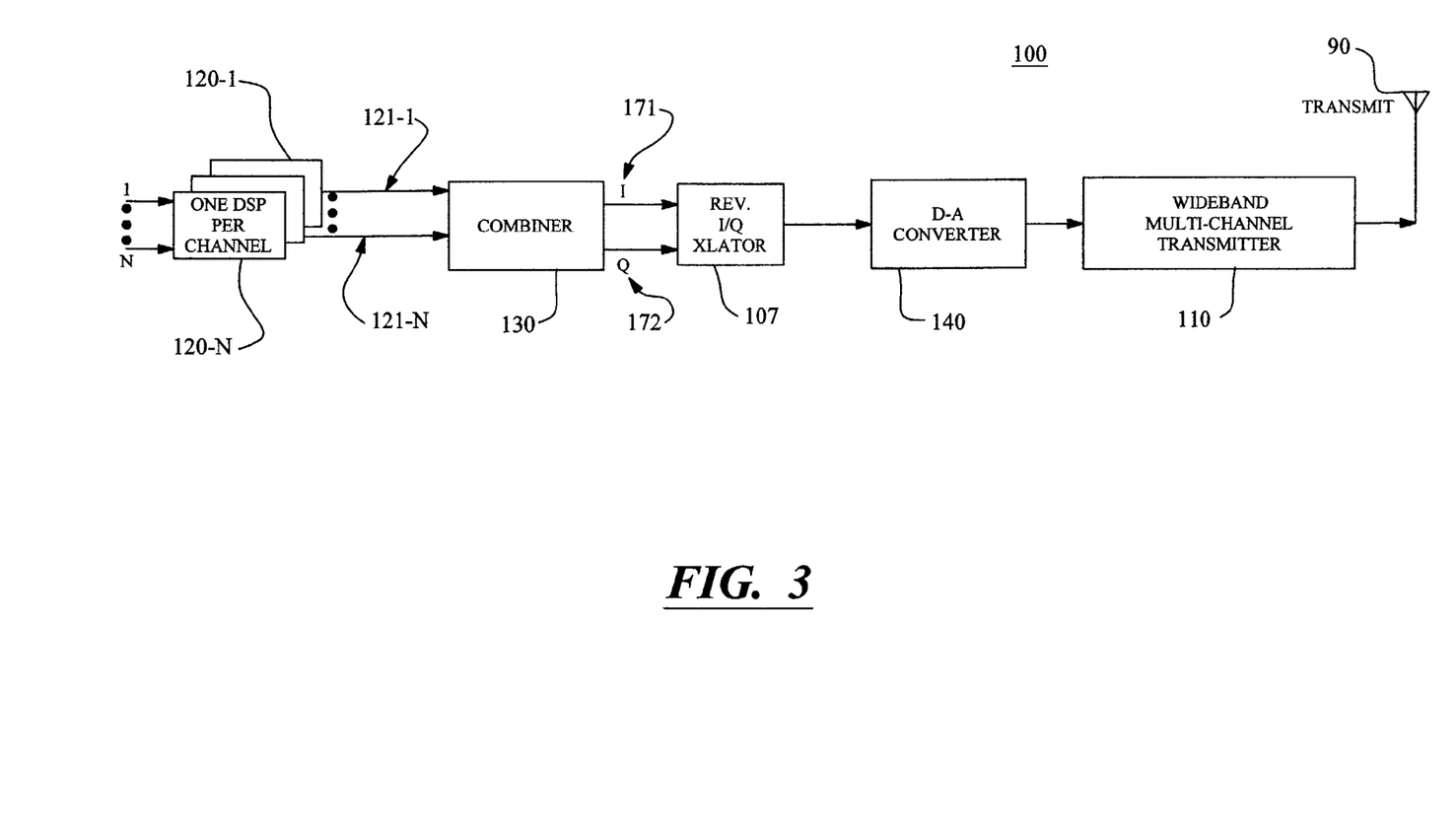
FIG. 3 illustrates processing of information signals in the transmit path of the base station transceiver of FIG. 2B.

FIG. 3 depicts the basic transmitter section 100 used with the instant invention. A receiver section 200 is discussed with reference to FIG. 4. The transmitter section 100, along with the receiver section 200 comprise a transceiver. The transmitter section 100 comprises a transmitter unit 110, an FFT based bandpass sampling signal combiner 130, a reverse In-Phase/Quadrature (I/Q) translator 107, a digital-to-analog (D-A) converter 140, and a plurality of digital signal processor (DSP) units 120-1 . . . 120-n, one DSP unit per channel. The transmitter section couples an antenna 90 for communicating over channels offered by the cellular communications service provider. The DSP units are coupled to receive respective ones of a plurality of digitized voice/data communication signals which are to be transmitted over respective frequency channels, 1 . . . N.

The DSP units 120-1 . . . 120-n modulate and perform pre-transmission error correction on respective ones of the plurality of incoming communication signals, and supply processed ones of the narrowband communication channels at respective ports. From the ports the modulated communication signals are supplied via channel links 121-1 . . . 121-n to respective ports of the bandpass sampling signal combiner unit 130, which outputs a combined signal. The combined signal represents the contents of a wideband signal which is a composite of respective narrowband signal channels input to the digital transmitter signal processor unit 120. One bandpass sampling signal combiner 130 is installed at each cell site, thereby allowing the transmitted channels to be combined with minimum insertion loss and maximum signal isolation between channels.

The bandpass sampling signal combiner 130 of the present invention is adapted for use an Advanced Mobile Phone Service (AMPS) 400 channel/30 KHz system, as well as a European 50 channel/200 KHz Global System for Mobile Radio (GSM) cellular standard.

For 30 KHz channels, a sample rate of 50 KHz is assumed. For 200 KHz, a 300 KHz sample rate is assumed. The combiner 130 receives channelized data as baseband signals from the DSP units 120-1 . . . 120-n, via channel links 121-1 . . . 121-n. The output of the combiner 130 is coupled to the I/Q translator unit 107. The reverse I/Q unit 107 receives respective in-phase and quadrature (I/Q) signal components from the combiner 130 via(I/Q) links 171, 172, respectively, and provides a combined output signal to the digital-to-analog (D/A) converter 140.

The output of the D/A converter 140 connects with the wideband multichannel transmitter 110. An amplified output of the transmitter 110 is then supplied to the antenna 90 for transmission over the air.

Figure 4:
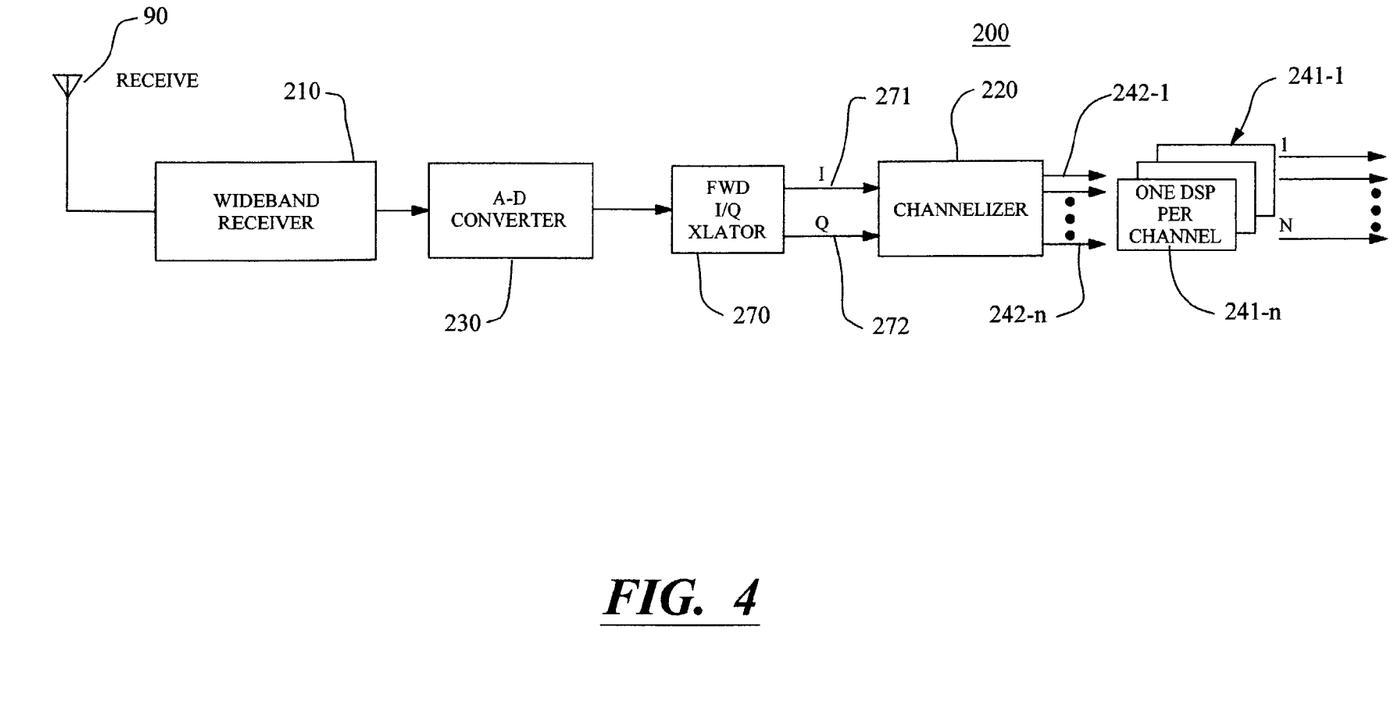
FIG. 4 illustrates processing of information signals in the receive path of the base station transceiver of FIG. 2B.

FIG. 4 depicts the basic receiver section 200 of the transceiver used with the present invention. The receiver section 200 includes a wideband receiver 210, a high speed analog-to-digital(A/D) converter 230, a forward in-phase/quadrature (I/Q) translator 270, an FFT based channelizer 220, and digital signal processing (DSP) units 241-1 . . . 241-n, one DSP unit per channel. The receiver section 200 couples with the antenna 90 for receiving cellular communication signals.

The output of the wideband receiver 210 is a downconverted, multi-channel signal containing the contents of all of the 30 KHz voice/data channels assigned to the service provider. The multichannel baseband signal is forwarded to the analog-to-digital converter 230, and then to the I/Q translator 270. The I/Q translator provides I and Q signals to the channelizer 220 via links 271, 272, respectively. The I/Q translator 270 processes the signals within any of the 400 channels of the system, and then outputs the signals via (I/Q) links 271 and 272 to the FFT channelizer 220. The FFT channelizer 220 then extracts from the composite digitized multichannel (I/Q) signal, respective narrowband channel signals representative of the contents of respective ones of the 30 KHz communication channels received by the wideband receiver 210. From the channelizer 220, the signals are fed to the DSP units on lines 242-1 . . . 242-n respectively. Each of the digital receiver processor units 241-1 . . . 241-n demodulates the signals of the respective channel and performs associated error correction processing based upon the content of the modulated signal. The demodulated signals derived by the DSP units 241-1 . . . 241-n are then coupled to a carrier interface such as a Public Switched Telephone Network (PSTN).

Figure 5:
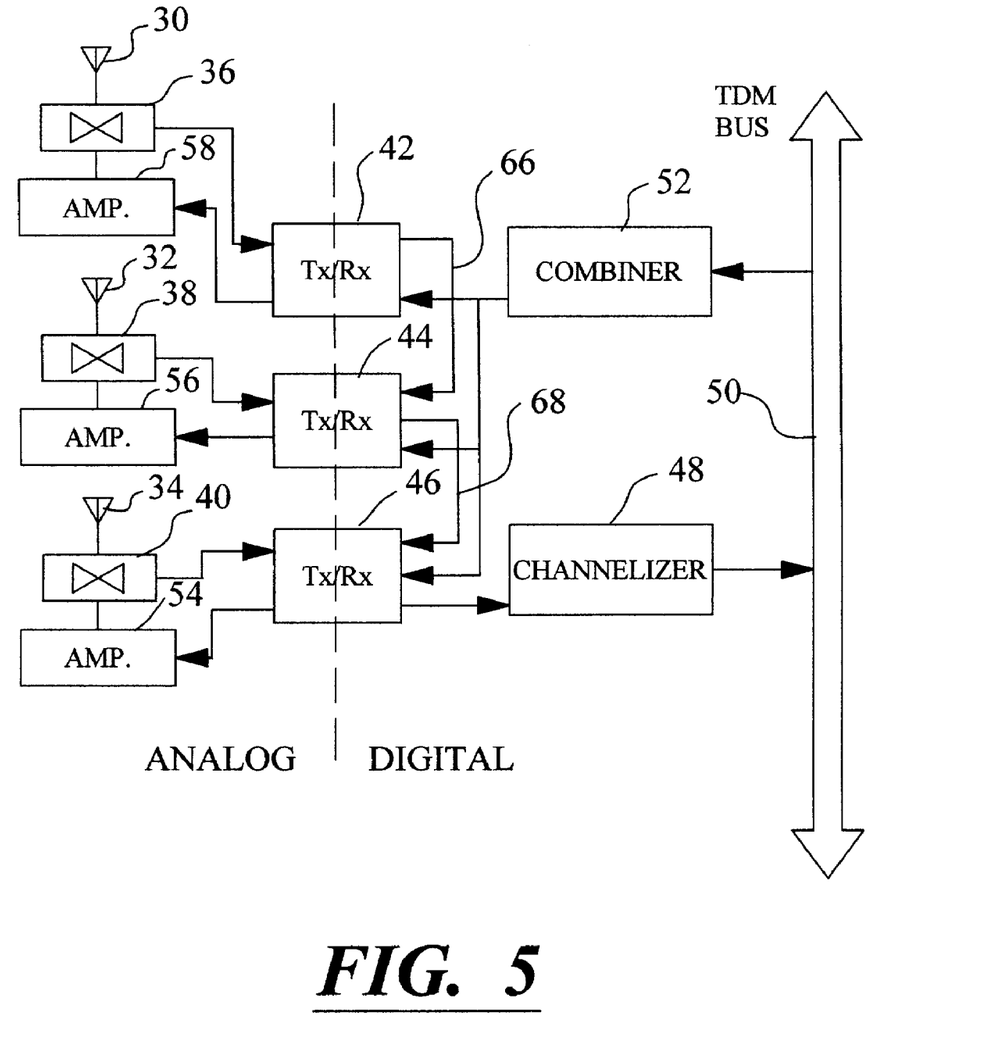
FIG. 5 depicts a circuit block diagram of the improvement of present invention.

FIG. 5 depicts the improvement provided by the present invention in which a non-sectorized cell is converted to a sectorized cell having three sectors. Although three are illustrated, the principles may be applied to any degree of sectorization. In the illustrated example, the spectrum of a given frequency band having a center frequency '$\Omega_o$ is divided into three equal bands having center frequencies '$\Omega_o$, '$\Omega_o-\alpha$ and '$\Omega_o+\alpha$. Assuming that a cell is allocated a bandwidth of five megahertz, each sub-band, for example, may be designed to handle one sub-band of one megahertz in bandwidth. In the receive path, respective sub-bands are used to convey analog RF signals in respective sectors with antennas 30, 32 and 34 through respective duplexers 36, 38 and 40. The duplexers supply the received signals to respective transceiver units 42, 44 and 46. Each of the transceivers include a front end for receiving incoming RF signals and an analog-to-digital converter for converting the analog signal to a digital data stream. According to the present invention, the digital data streams from transceivers 42, 44 and 46 are combined, i.e., processed by digitally adding, and supplied to a single channelizer 48 which, like channelizer 18 and 19 (FIG. 2B) supplies digital data signals associated with respective subscribers to TDM bus 50.

In the reverse path, TDM digital data signals which emanate from TDM 50 are supplied to a combiner 52 which feeds each of the respective transceivers 42, 44 and 46. Each of the transceivers 42, 44 and 46 select the appropriate data from the combiner by conventional means by digital filtering or processing. The transceivers convert the digital signal to analog form. After conversion, power amplifiers 54, 56 and 58 associated with the respective sectors effect emission of radiated power in the respective sectors.

Advantageously, amplifiers 54, 56 and 58 operate at lower power levels than the single high power amplifier 28 (FIG. 2B) in a non-sectorized cell, thereby providing substantial cost savings. More importantly, instead of deploying three combiner and channelizer pairs the improved sectorized cell requires only a single combiner and channelizer pair comprising channelizer 19 and combiner 20, thereby providing further economies. The invention only requires software modification of the combiner and channelizer pair used in a single cell site to handle information distributed in different spectral bands associated with the sectors.

Figure 6:
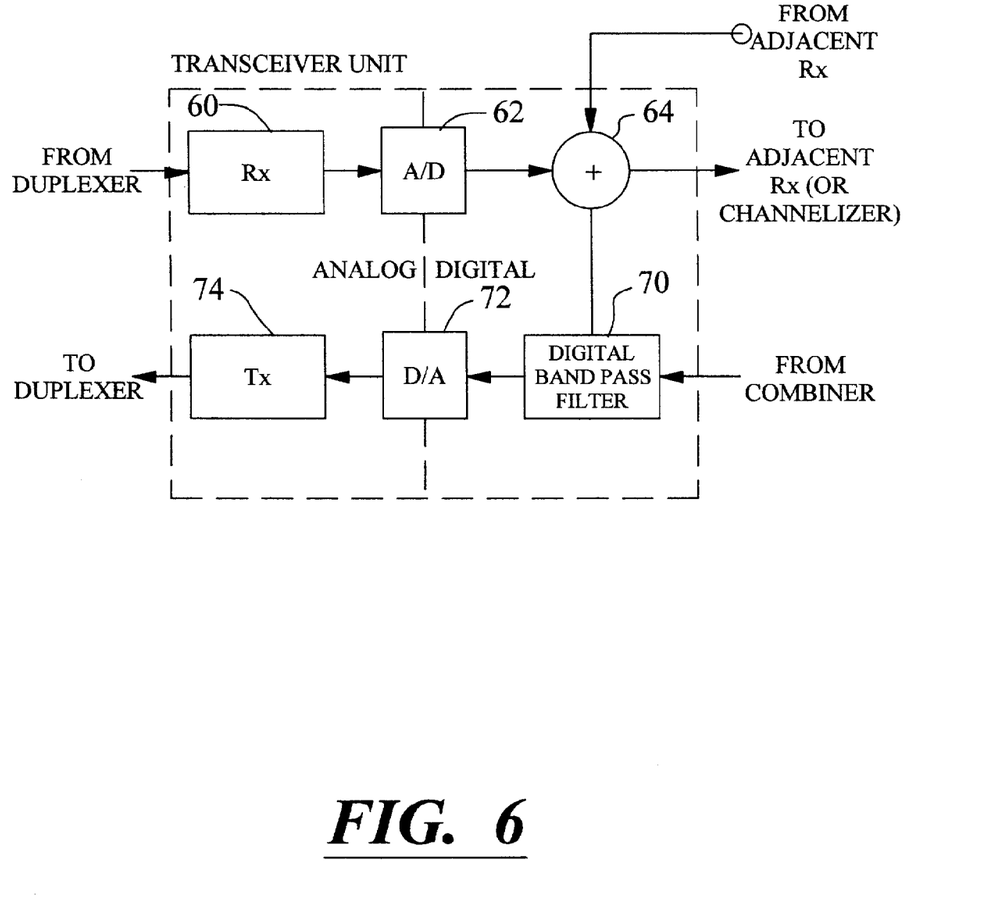
FIG. 6 depicts a transceiver unit of the circuit diagram of FIG. 5.

FIG. 6 depicts further details of the transceivers 42, 44 and 46 of FIG. 5, which perform transmultiplexing operations. The receive path of a transceiver (FIG. 5), for example, includes a receiver 60, an analog-to-digital converter, and a digital adder 64. Digital adder 64 receives digital samples from the digital adder of an adjacent preceding transceiver. The output of digital adder 64 is supplied to the digital adder of an adjacent subsequent transceiver, and the digital adder of the last transceiver in the sequence is supplied to the channelizer 48, as depicted by connections 66 and 68 of FIG. 5. On the transmit side of the transceiver, digital signal samples from the combiner 52 enter a digital band pass filter 70 which passes signal samples associated with the respective sectors. The digital signal samples are then converted to analog form by digital-to-analog converter 72 and supplied to a transmitter unit 74. Transmitter unit 74 then supplies a resulting analog signal to a respective amplifier/duplexer pair for transmission to subscribers.

While we have shown and described several embodiments in accordance with the present invention, it is to be understood that the invention is not limited thereto, but is susceptible to numerous changes and modifications as known to a person skilled in the art, and we therefore do not wish to be limited to the details shown and described herein, but intend to cover all such changes and modifications as are obvious to one of ordinary skill in the art.

I claim:

1. A cellular communication system, comprising:
   an antenna device to sectorize a cell into a plurality of sectors, said cell allocated a band of frequencies, said plurality of sectors each assigned a sub-band of said allocated band of frequencies, each said sub-band comprising a plurality of subchannels, said plurality of sectors each conveying a plurality of analog RF signals within each sector's assigned sub-band;
   a plurality of transceiver units, each said transceiver associated with one of said plurality of sectors, to receive said plurality of analog RF signals from said plurality of sectors, respectively, to convert said plurality of analog RF signals to a plurality of digital data streams, respectively;
   structure to combine said plurality of digital data streams into a single digital data stream;
   a single channelizer to receive said single digital data stream, to generate therefrom a digital data signal associated with each of said plurality of subchannels of said plurality of sectors, and to supply said digital data signals to a bus;
   a single combiner to receive said data signals from said bus, and to generate therefrom a single combined digital data signal associated with said plurality of subchannels of said plurality of sectors;
   each of said plurality of transceiver units receiving said combined digital data signal from said single combiner, said transceiver units each selecting from said single combined digital data signal all said subchannel data within said assigned sub-band associated with said respective one of said plurality of sectors, and converting said subchannel data into an analog signal; and
   a plurality of power amplifiers in said plurality of sectors, respectively, to amplify each said analog signal for emission.

2. The cellular communication system according to claim 1, wherein said antenna device divides said allocated band of frequencies into said sub-bands, wherein each said sub-band has an approximately equal bandwidth.

3. The cellular communication system according to claim 1, wherein said plurality of power amplifiers in said plurality of sectors operate at lower power levels than a power amplifier in a non-sectorized cell.

4. The cellular communication system according to claim 1, wherein said plurality of transceiver units are broadband transceivers.

5. The cellular communication system according to claim 1, wherein said plurality of transceiver units each include a digital band pass filter which receives said combined digital data signal from said single combiner and which passes said subchannel data associated with said respective plurality of sectors.

6. A cellular communication system, comprising:
   an antenna device to sectorize a cell into a plurality of sectors which accommodate a plurality of subchannels, respectively, said plurality of sectors conveying a plurality of analog RF signals, respectively;
   a plurality of transceiver units to receive said plurality of analog RF signals from said plurality of sectors, respectively, to convert said plurality of analog RF signals to a plurality of digital data streams, respectively, and to combine said plurality of digital data streams into a single digital data stream;
   a single channelizer to receive said single digital data stream, to generate therefrom a digital data signal associated with said plurality of subchannels of said plurality of sectors, and to supply said digital data signals to a bus;
   a single combiner to receive said digital data signal from said bus, and to generate therefrom a combined digital data signal associated with said plurality of subchannels of said plurality of sectors;
   each of said plurality of transceiver units receiving said combined digital data signal from said single combiner, selecting from said combined digital data signal a subchannel data associated with said respective plurality of sectors, and converting said subchannel data into an analog signal, said plurality of transceiver units each include an exclusive OR gate which receives one of said plurality of digital data streams from said exclusive OR gate of an adjacent preceding one of said plurality of transceiver units and which outputs to an adjacent subsequent one of said plurality of transceiver units, and said single digital data stream output from said exclusive OR gate of a last one of said plurality of transceiver units being supplied to said single channelizer, and
   a plurality of power amplifiers in said plurality of sectors, respectively, to amplify each said analog signal for emission.

7. A receiver apparatus in a cellular communication system, comprising:
   an antenna device to sectorize a cell into a plurality of sectors which accommodate a plurality of subchannels, respectively, said plurality of sectors conveying a plurality of analog RF signals, respectively;
   a plurality of receiver units to receive said plurality of analog RF signals from said plurality of sectors, respectively, to convert said plurality of analog RF signals to a plurality of digital data streams, respectively, and to combine said plurality of digital data streams into a single digital data stream, said plurality of receiver units each include an exclusive OR gate which receives one of said plurality of digital data streams from said exclusive OR gate of an adjacent preceding one of said plurality of receiver units and which outputs to an adjacent subsequent one of said plurality of receiver units, and said single digital data stream output from said exclusive OR gate of a last one of said plurality of transceiver units being supplied to said single channelizer, and
   a single channelizer to receive said single digital data stream, to generate therefrom a digital data signal associated with said plurality of subchannels of said plurality of sectors, and to supply said digital data signal to a bus.

* * * * *